Aug. 7, 1956 G. F. VERHAGE ET AL 2,757,745
VARIABLE PITCH ROTOR BLADE CONSTRUCTION
Filed April 21, 1952 6 Sheets-Sheet 1

INVENTORS.
GERARD FRANS VERHAGE
JAN MEIJER-DREES
BY

Aug. 7, 1956  G. F. VERHAGE ET AL  2,757,745
VARIABLE PITCH ROTOR BLADE CONSTRUCTION
Filed April 21, 1952  6 Sheets-Sheet 4

INVENTORS:
GERARD FRANS VERHAGE,
BY JAN MEIJER DREES.

ATTY.

United States Patent Office 2,757,745
Patented Aug. 7, 1956

2,757,745

VARIABLE PITCH ROTOR BLADE CONSTRUCTION

Gerard Frans Verhage, The Hague, and Jan Meijer Drees, Amsterdam, Netherlands

Application April 21, 1952, Serial No. 283,358

31 Claims. (Cl. 170—160.25)

This invention relates to a thrust torque converting mechanism for connecting two, preferably coaxial, bodies. More particularly it deals with a mechanism for providing a coupling between two bodies in which the axial force between them has a predetermined relationship to the torque between them, such as for example between the bodies comprising the hub and the blade or blades of a propeller. Herein the operation of the mechanism of this invention will be directed primarily to the propellers of aircraft including the rotors or wind-mill type blades of helicopters and autogiros.

Previously, in the operation of aircraft of the horizontal rotating blade type, the pilot of such craft must be continually alert and responsive to every change in speed, air current, air density, and tilt of the ship so that the pitch of the blades which support the weight of the ship may be immediately adjusted to maintain the desired position and level of the aircraft or airship.

It is the purpose of this invention to control this pitch of blades of such aircraft automatically, thereby materially relieving the strain on the pilot, as well as making ship travel more even and comfortable.

Another purpose is to provide a new, useful, simple, efficient, economic and effective thrust torque and/or torque thrust converting control mechanism whereby, for example, the above mentioned results may be obtained.

Another object is to provide such a converting mechanism for automatically changing the pitch of a propeller blade to compensate for the load, speed, change in fluid density, and the like, for the craft on which it is used.

Another object is to provide a thrust torque converting mechanism which is variable and/or adjustable at the will of an operator.

Another object is to provide a mechanism which will automatically decrease the angle of incidence of the blade into the air stream when its speed decreases.

Another object is to provide a mechanism which will sustain a constant lift automatically, regardless of the air speed of a helicopter or autogiro blade.

Another object is to provide an automatic mechanism for maintaining a constant rotor speed for an autogiro, that is, a mechanism which increases the pitch when overspeeding of the rotor occurs to thereby increase the drag on the blade of the rotor to slow the blades down.

Another object is to automatically control the pitch of a helicopter rotor blade in case of engine failure to obtain normal auto-rotation speed for the blades without the operator touching the controls, that is, to decrease the pitch of the blade which must be done within one second from the time the engine fails to prevent the rotor from stopping its rotation and to prevent dropping of the airship.

Still another object is to provide dynamic stability for the rotor of a helicopter or autogiro including automatically smoothing out the bumps and the higher harmonics of vibration in the rotor blades by means of the mechanism of this invention.

In general, the thrust torque converting mechanism of this invention comprises two bodies and a connecting means between them. These two bodies are positioned so that one body is rotatably movable with respect to the other about an axis extending between said bodies. The connecting means extends along a line or separate lines between said two bodies, which line or lines are not parallel to nor in the same plane with said axis between said bodies. In other words, the lines along which the connecting means extend are spaced from and at an angle to said axis between said bodies, so that said line or lines are along what might be considered long pitch lines extending between said bodies. The ends, of these pitch lines of connection between said bodies, are joined to their corresponding bodies by joints which may be rigid, universal of the crossed axis type, or ball and socket, depending upon the properties of the connecting means itself and the forces to be converted by the mechanism. These joints are radially spaced from said axis at each body and these radial distances provide the lever arms of the torque converted by the mechanism. The connecting means itself which extends along said pitch lines between said bodies may be a rod, cable or similar member which may be more or less resilient in itself depending upon the type of joint employed at its ends and the amount and direction of the forces to be converted by the mechanism. The connecting means or links also may comprise more than one link, rod or body element which plurality of groups of elements per link also may be joined end to end in a series with the opposite two ends of each series being connected to the two bodies. In the event the ends of the connecting means are pivotally mounted at said bodies, additional means may be provided acting between said bodies, which additional means is resilient in character such as a spring, to maintain the original relative twisted position between said bodies. Thus, said connecting means between said two bodies is so positioned and fastened to said bodies to tend to maintain a given angular and spaced position between said two bodies, whereby a thrust along said axis will be converted into a torque around said axis between said bodies, and a torque around said axis between said bodies will be converted into a thrust along said axis.

In adapting this thrust torque converting mechanism to a propeller or rotor, one of said two bodies may be the hub of the propeller and the other of said two bodies may be one of the blades thereof, whereby the mechanism thereby controls automatically the pitch of the blade of the propeller depending upon the centrifugal force or thrust, and the lift or torque, and/or other forces acting upon the blade.

If desired, the mechanism may be provided with means for adjusting and/or varying the lever moments of the mechanism to account for different conditions, either during operation, or before its operation.

The above mentioned and other features and objects of this invention and the manner of attaining them are given more specific disclosure in the following description of embodiments of the invention taken in conjunction with the accompanying drawings, wherein.

Controls for a helicopter

Figure 1:
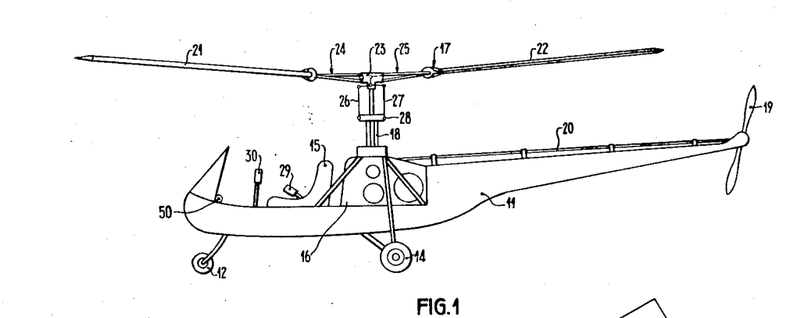
Fig. 1 is a side elevation of a helicopter embodying the mechanism of this invention.
Figure 2:
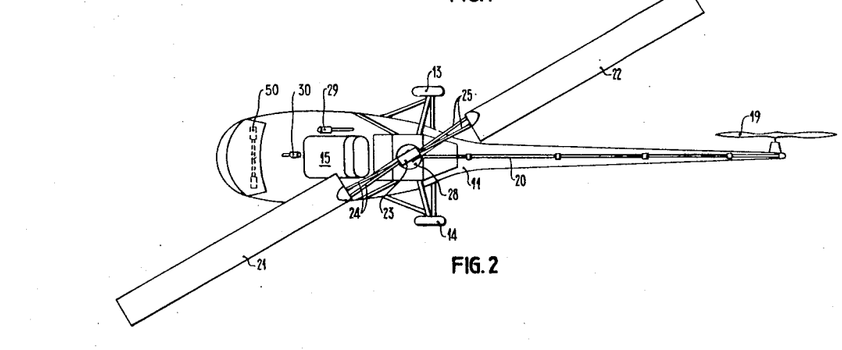
Fig. 2 is a plan view of the helicopter shown in Fig. 1.

In Figs. 1 and 2 there is shown a helicopter comprising a fuselage 11 with ground wheels 12, 13 and 14, a cockpit having a pilot's seat 15, a motor 16, a two-bladed single horizontal rotor 17 mounted on a mast or pylon 18, and an anti-torque tail rotor or propeller 19 driven by shaft 20 from the engine 16. The horizontal rotor 17 comprises a pair of oppositely extending blades or vanes 21 and 22 which are connected to a hub 23 by means of pairs of rods 24 and 25 which also automatically regulate the pitch of the vanes according to the thrust torque converting mechanism of this invention which will be described in detail later.

The manual control of the pitch of the blade 21 and 22 is accomplished in this embodiment through means of link levers 26 and 27, a swash plate assembly 28, the level and tilt of which plate 28 is controlled from the cockpit by the pilot through the means of the levers 29 and 30, respectively. These controls are better illustrated diagrammatically in Fig. 3, in which the engine 16 of the ship is connected by bevel gears 31 and 32 to the vertical central mast shaft 33, which shaft is fixed at its upper end to the hub 23, and thence to blades 21 and 22 for rotating said blades. Surrounding the shaft 33 is a non-rotatable sleeve 35 which may slide axially along the shaft 33 and which may be provided with a universal type or ball and socket joint 36 at its upper end, the socket of which may be connected to an annular wobble or swash plate 37 of the swash plate assembly 28. Around the periphery of the swash plate 37 is rotatably journalled a ring 38 to diametrically opposite sides of which are pivoted one end of each of the lever links 26 and 27, which rotate with the propeller or rotor 17, while the other ends of said links are fastened to the hub 23 by means of L-shaped levers 40 and 41. The levers 40 and 41 are connected by links such as 42 and 43 extending radially outwardly through the vanes or blades 21 and 22 to other levers such as 44 for operating ailerons such as 45. The sleeve 35 may be connected directly by a link 46 to the manual lever 29 whereby the whole swash plate assembly is moved up and down on the shaft 33 to move the ailerons 45 on the blades simultaneously the same amount, such as in the case of vertical movement of the aircraft or airship. The plate 37 may be connected by a link 47 to an L-shaped lever 48 pivotally mounted on the sleeve 35 and then connected by means of a link 49 to the manual lever or joy-stick 30 for periodically varying the ailerons 45 to elevate more on one side of rotation of the rotor 17 than on the other side. Foot pedal controls 50 shown in Figs. 1 and 2 govern the blade pitch of the anti-torque rotor 19. The lever 30 is also connected through links 51, 53, and 55 and intermediate L-shaped levers 52 and 54 (see Fig. 3a) to the swash plate 37 at right angles to the connection of link 47 (at a point broken away in Fig. 3) to effect bilateral control movements, i. e. tilt of the plate about a horizontal axis perpendicular to the axis about which tilt can be effected by lever 30. Thus, said plate 37 can be tilted into any plane about the ball and socket joint 36 to effect tilting movement of the ship which in turn produces movement of the ship in a corresponding horizontal direction, that is, forward, rearward, and right and left turns, by holding the swash plate out of a plane perpendicular to the axis of rotation of the rotor 17 or to the shaft 33. Accordingly, by the manipulation of levers 29, 30 and 50, the helicopter may be caused to move in any direction in three-dimensional space by changing the effective pitch or ailerons on the blades of the main rotor 17.

Figures 3, 3A:
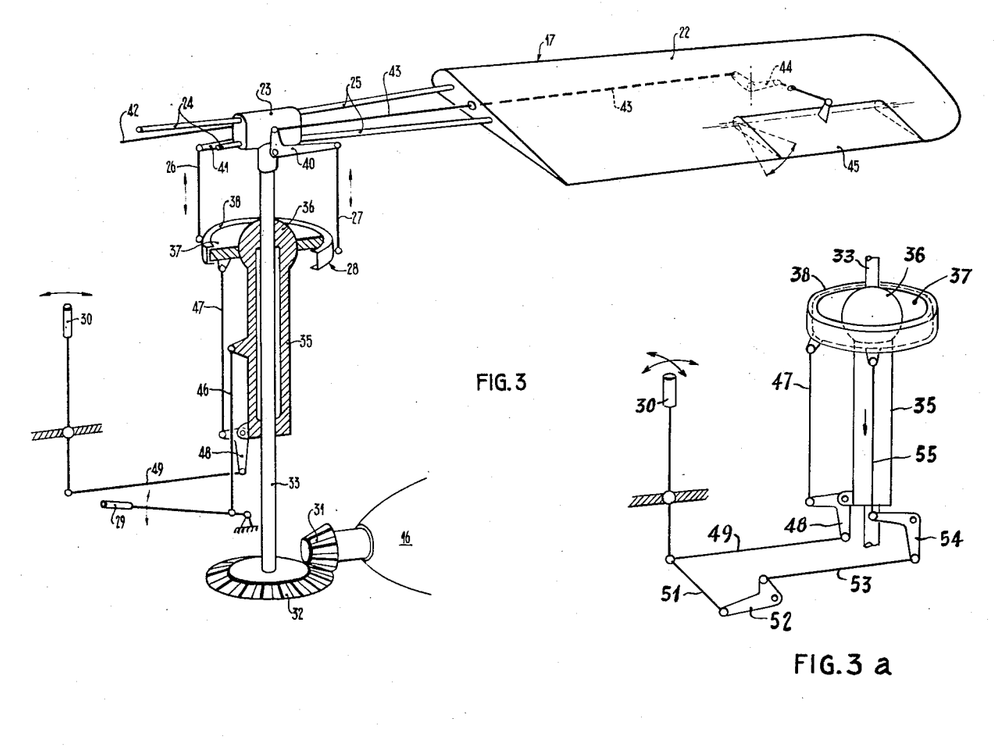
Fig. 3 is a perspective view with parts broken away of the driving mechanism for a rotor blade of the helicopter shown in Fig. 1 incorporating an embodiment of the thrust torque converting mechanism of this invention.
Fig. 3a is an unsectioned perspective view of that portion of Fig. 3 showing the manual control means for the swash plate.
Figure 3B:
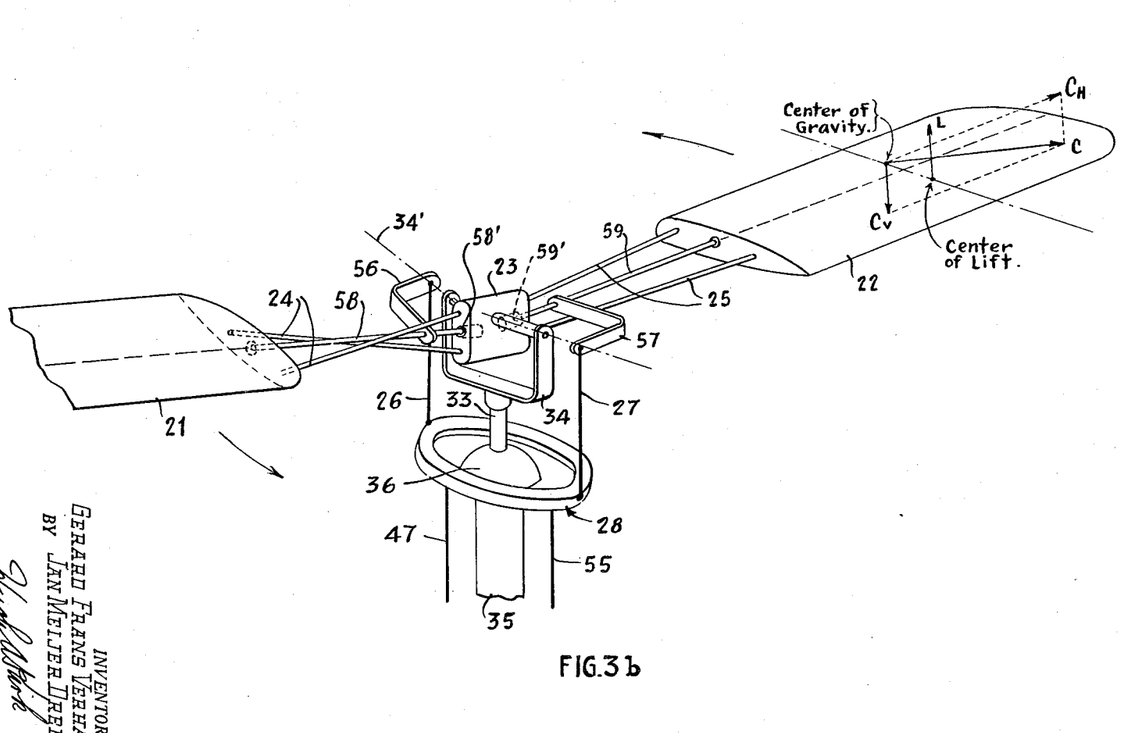
Fig. 3b is a perspective view with parts broken away of a driving mechanism for a rotor blade of a helicopter shown in rotation as in flight toward the viewer, and adapted for controlling the pitch of the blade without the use of ailerons on the blade.

Instead of the ailerons 45 on the blades 21 and 22 as shown in Fig. 3, the whole blades may be twisted to change their pitch as shown by the device in Fig. 3b in which the hub 23 is mounted on a yoke 34 supported by the shaft 33 permitting angular rotation of the blades 21 and 22 about a horizontal axis 34' passing through the hub 23 and journalled in the arms of the yoke 34. In this embodiment of Fig. 3b the control of the swash plate 28 may either be controlled by the links disclosed in Fig. 3 or 3a, but the link levers 26 and 27 are herein connected to rigid L-shaped levers 56 and 57 along the axis 34', which levers 56 and 57 are rigidly attached to torsion bars 58 and 59, respectively, extending along the axis of rotation of the blades 21 and 22 into frictionless bearings 58' and 59' which may be mounted in the hub 23. The torsion rods 58 and 59 are fixedly anchored to their respective blades 21 and 22. Thus as the swash plate 28 is wabbled, correspondingly equal and opposite twists will be applied to the bars 58 and 59 to rotate the blades 21 and 22 about their corresponding axes of rotation, thereby changing the pitch of the blades in a manner similar to that effected by the ailerons 45 disclosed in Fig. 3 and described above.

There is also shown in Fig. 3b vectors representing the forces acting on the blade 22 while it is in rotation to fly the airship to which it is connected in a direction toward the viewer. These forces are represented by vectors L and C, the latter of which may be divided into the components $C_H$ and $C_V$ which are respectively parallel and perpendicular to the longitudinal rotational axis of the blade itself. The force L is directed upwardly perpendicular to the surface or plane of the blade 22 from the center of lift or aerodynamic center of the blade 22.

The force C is directed from the center of gravity of the blade 22 and corresponds with the centrifugal force applied to the blade while it is in rotation. The two components of this force C may be resolved into the vector $C_V$ which is perpendicular to the blade and forms a moment or couple with the force L to rotate the blade 22 about its own longitudinal axis; and the vector $C_H$ which is parallel with the longitudinal axis of the blade 22 and exerts a tension in the bars or rods 25. Thus, in the normal rotation of the blades 21 and 22 shown in Fig. 3b, the cyclic pitch of the backward moving blade 22 is increased and that of the forward moving blade 21 is reduced. The weight of the blade herein is neglected with respect to the component vector $C_V$ in that the weight only comprises a fraction of the force represented by this vector. This will be further described later in connection with Figs. 5 and 8.

It is for the automatic compensation of the pitch of the vanes or blades 21 and 22 of a rotor or any propeller, that the thrust torque conversion mechanism of this invention is concerned. In the case of a helicopter, for example, the pilot thereof need not continuously be changing the position of his control levers to compensate for air pockets, air density, air speed, speed of rotation of the rotor, and the like. Since these factors of change are related to the forces already applied to and within the vanes or blades during their rotation, namely the forces of lift, drag, centrifugal force, gravity, and the like, the changes in them due to these factors are employed through the means of the thrust torque converting mechanism of this invention for automatically compensating for their effects on the movement of the airship. Accordingly, a simplified form of this thrust torque mechanism will now be described in connection with Figs. 4 and 4a.

The thrust torque converter

Figure 4:
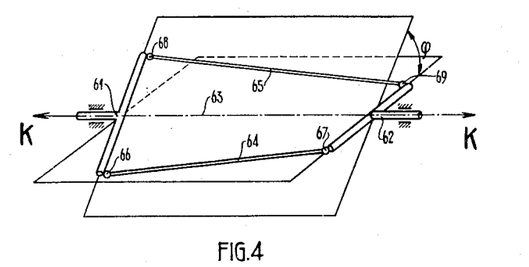
Fig. 4 is a perspective diagrammatic view of a simplified form of the thrust torque converter of this invention illustrating its principles of operation.

The three essential elements of the thrust torque converter mechanism are shown in Fig. 4. These elements are the two spaced structures or bodies 61 and 62 which are rotatable with respect to each other around the axis 63 passing through both of said bodies, and the means for connecting said two bodies together comprising one or more longitudinal members 64 and 65, which members normally are connected along imaginary lines spaced from and at an angle or angles to the axis 63. The connecting means or members 64 and 65 must be made of a solid material which has compression strength or tensile strength or both, and may also have torsional strength. If the connecting means 64 and 65 only have compression strength, then it is necessary that they be maintained under compression at all times during the operation of the mechanism although the amount of compression will vary. If the connecting means 64 and 65 only have tensile strength, as a cord or rope, then it is necessary that they remain under at least some tension at all times during the operation of the mechanism. However, it is preferred that the connecting means or members 64 and 65 are solid rods or bars having both compression and tensile and even torsional strengths, particularly when this thrust torque converter mechanism is employed in a propeller as above described. The joints 66, 67, 68 and 69 which fasten the ends of the connecting means or members 64 and 65 to the structure or bodies 61 and 62, may range from being completely rigid to completely flexible depending upon the properties of the members 64 and 65 and the type of forces applied to the mechanism. However, it is necessary that all the joints at the same body are the same and are located at the same radial distance from the center line 63, that is, both the joints 66 and 68 at body 61 should have the same degree of rigidity or flexibility and be the same radial distance from the center line 63, although the radial distance from center line 63 to joint 66 or 68 need not necessarily be the same as the radial distance from the center line 63 to the joint 67 or 69.

If one of the bodies 61 or 62 is fixed from rotating about the axis 63, then a thrust or axial force K along the axis 63 will tend to rotate the other body about said axis 63 due to the angular position of the connecting means 64 and/or 65; and vice versa a rotation of one of the bodies 61 or 62 with respect to the other will cause an axial thrust K along the axis 63 because of the same angular connection between the bodies. For example, a thrust K axially along the line 63 toward the right tending to pull the body 62 away from the fixed body 61, will tend to straighten the rods or bars 64 and 65 so that they will approach parallelism to the axis line 63, which exerts a force on the joints 67 and 69 at the body 62 to rotate said body 62 about said axis 63 thereby producing a torque. When the thrust K is in the opposite direction, i. e. toward the left, the rods 64 and 65 are twisted around the axis to become farther from parallelism with the axis 63, which produces a torque to rotate the body 62 in the opposite direction. Conversely, if a torque is applied trying to rotate one of the bodies with respect to the other, the distance between the bodies is either lengthened or shortened depending upon the direction of rotation attempted, which lengthening or shortening of the distance between the bodies produces an axial thrust along the axis 63 of said rotation. Thus the mechanism, according to this invention, converts thrusts into torques and vice versa.

The thrust torque converter so produced has many practical applications, including, as for example herein, the changing of the pitch of a propeller blade or vane when in rotation in accordance with the components of the centrifugal force C and the lifting force L (see Figs. 3b, 5 and 8) when the center of gravity and the center of lift of the blade are laterally spaced from each other. The vertical component $C_V$ of the centrifugal force C then forms a couple with the opposite lift force L to tend to rotate the blade around its longitudinal axis to change its pitch, which is counteracted by and maintained in equilibrium with the thrust force corresponding to the horizontal component $C_H$ of the centrifugal force C acting axially through the center line of the blade (as force K in Fig. 4) on the thrust torque converter mechanism of this invention located between the hub and the butt end of the blade of the propeller. If the joints 66, 67, 68 and 69 (see Fig. 4) are rigid or integral with the bodies 61 and 62, they can transfer directly the torsional forces set up during the operation of the mechanism. However, if a ball and socket joint as in Fig. 6 or a universal joint as in Fig. 7 were employed at these joints, then an additional resilient means such as a spring may be applied to act between the bodies to tend to maintain the bodies in a given relative position.

Figures 4A, 7:
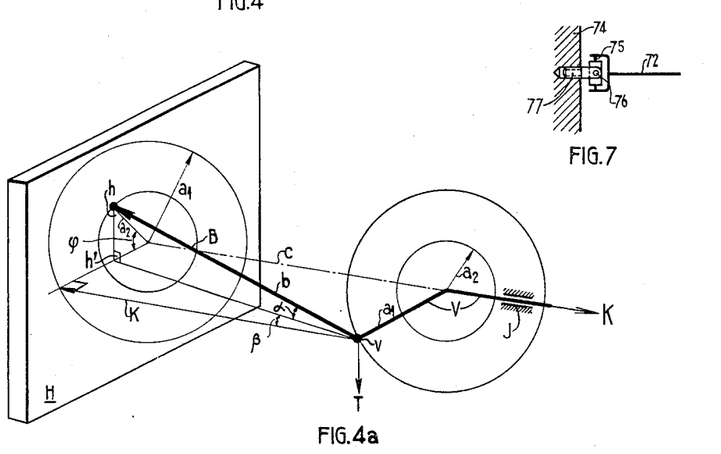
Fig. 4a is a perspective mathematical diagram of a simple form of the torque converter of this invention useful in deriving the equation of the relationship between the torque and thrust converted thereby.
Fig. 7 is a diagrammatic view of a type of universal joint of the type of a Cardan joint which may be used in fastening an end of the connecting means to one of the two bodies of the converting mechanism of this invention.
Figure 6:
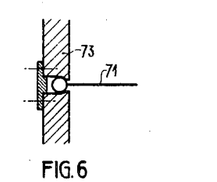
Fig. 6 is a diagrammatic view of a universal joint of the type of ball and socket joint which may be used in fastening an end of the connecting means to one of the two bodies of the converting mechanism of this invention.

There is a difference between the ball and socket joint of Fig. 6 and the universal Hooke, or Cardan joint of Fig. 7 for the connection of a connecting means or rod 71 and 72, respectively, to a body 73 and 74. In the ball and socket joint, rotation in all directions is freely permitted including rotation around the axis of the rod 71 so that not even torsion is produced in the connecting rod 71. While in the universal joint of Fig. 7, only rotations about the axes 75 and 76 in the plane perpendicular to the axis of the rod 72 are permitted, while rotation of the rod about its own axis is resisted by the tight screw connection 77 with the body 74. Thus more resistance to torque is obtained with crossed axis type of universal joints than with ball and socket joints, which latter offer no resistance at all and generally require the addition of a spring or resilient means to maintain a given position or equilibrium between thrust and torque in an operative connection.

Theory of operation of the converter

For a simple general form of the converter, reference is had to Fig. 4a in which one of the bodies H is considered stationary (corresponding to 61) and the other of the bodies V is journalled in bearing J to be rotatable about the axis $c$. The connecting means, of length $b$, is connected at one end $v$ to the body V at a radius $a_1$ from the axis $c$, and fixed to the body H at the other end $h$ at a radius $a_2$ from said same axis $c$, the angle between said radii $a_1$ and $a_2$ being $\varphi$. The angles between means $b$ and axis $c$ in the planes formed by $a_1$ of V, end $v$ and axis $c$ and the plane perpendicular to this plane through the end $h$ and the connecting means $b$, are respectively $\beta$ and $\alpha$. If in this system the joints and ends $v$ and $h$ are freely movable, such as ball and socket joints shown in Fig. 6, and a thrust K occurs along the axis $c$, against body V, then the moment $M_c$ of the device about said axis $c$ can be calculated according to a simple formula derived as follows:

In calculating the tension B in the bar or connecting means of length $b$, it can be considered that a force equal to K is applied at end $v$ parallel to axis $c$ and the force K, and an equal and opposite force to that of K is applied to the end $h$ along a line parallel to axis $c$; and that the component T of the force B in the bar $b$ tangent to the circle of radius $a_1$ at end $v$, is the force of the torque applied through a lever arm of length $a_1$. This torque or component T of the force B in bar $b$ is parallel to and graphically corresponds to the line $h$—$h'$ of the triangle $v$—$h$—$h'$ of forces. Thus since $$M_c = a_1 T \text{ and } T = B \sin \alpha$$

then:

$$M_c = a_1 B \sin \alpha$$

and since $$B = K\left(\frac{1}{\cos \beta} \cdot \frac{1}{\cos \alpha}\right)$$

according to the force diagram of Fig. 4a, then:

$$M_c = a_1 \frac{K \sin \alpha}{\cos \beta \cos \alpha} = a_1 \frac{K \tan \alpha}{\cos \beta} \quad (1)$$

Converting the angles $\alpha$ and $\beta$ into functions of the angle $\varphi$, which is the actual relative angular displacement between the bodies H and V, we find according to the geometric diagram on Fig. 4a, that $$b \sin \alpha = a_2 \sin \varphi$$

and by the Pythagorian theorem, $$b \cos \alpha = \sqrt{b^2 - a_2^2 \sin^2 \varphi}$$

then $$\tan \alpha = \frac{\sin \alpha}{\cos \alpha} = \frac{a_2 \sin \varphi}{\sqrt{b^2 - a_2^2 \sin^2 \varphi}} \quad (2)$$

Similarly, since $$\cos \beta = 1 - \sin^2 \beta$$

then $$\sin \beta = \frac{a_1 - a_2 \cos \varphi}{\sqrt{b^2 - a_2^2 \sin^2 \varphi}}$$

and substituting one in the other:

$$\cos \beta = 1 - \sqrt{\frac{(a_1 - a_2 \cos \varphi)^2}{b^2 - a_2^2 \sin^2 \varphi}}$$

expanding and combining this equation:

$$\cos \beta = \sqrt{\frac{b^2 - a_1^2 - a_2^2 + 2a_1 a_2 \cos \varphi}{b^2 - a_2^2 \sin^2 \varphi}} \quad (3)$$

Substituting the value of $\tan \alpha$ and $\cos \beta$ from Equations 2 and 3 above into Equation 1 above;

$$M_c = a_1 K \cdot \frac{a_2 \sin \varphi}{\sqrt{b^2 - a_2^2 \sin^2 \varphi}} \cdot \frac{1}{\sqrt{\frac{b^2 - a_1^2 - a_2^2 + 2a_1 a_2 \cos \varphi}{b^2 - a_2^2 \sin^2 \varphi}}}$$

which reduces to $$M_c = \frac{a_1 K a_2 \sin \varphi}{\sqrt{b^2 - a_1^2 - a_2^2 + 2a_1 a_2 \cos \varphi}} \quad (4)$$

When $a_1$ and $a_2$ in Equation 4 are much smaller than $b$, then it can be assumed that the last three terms in the denominator of this Equation 4 will be so small that they can be disregarded and the whole denominator can be substituted for $$\sqrt{b^2} = b$$

so that, for all practical purposes, $$M_c = \frac{K a_1 a_2 \sin \varphi}{b} \quad (5)$$

If a tension helical spring is employed between the bodies V and H in such a system, or if the joints at ends $v$ and $h$ are rigid and act as a spring, then the moment $M_s$ for the spring alone in the system, without external forces on the system, is $$M_s = K_s(\varphi - \gamma) \quad (6)$$

where $K_s$ is the spring constant of the spring alone, that is the differential of $M_s$ with respect to $\varphi$ or $$\frac{dM_s}{d\varphi}$$

and $\gamma$ is the angle of twist of the spring when the moment $M_s = 0$.

Combining Equations 5 and 6 for the total moment $M_t$ of such a system:

$$M_t = M_c + M_s = \frac{K a_1 a_2 \sin \varphi}{b} + K_s(\varphi - \gamma) \quad (7)$$

Differentiating this Equation 7 with respect to $\varphi$ to obtain the value of the spring constant $K_w$ for the whole system including the spring and the action of the bars or connecting means:

$$K_w = \frac{dM_s}{d\varphi} = \frac{K a_1 a_2}{b} \cos \varphi + K_s \quad (8)$$

The spring constant $K_w$ may be very small when $\varphi = 90°$ (the preferred angle for $\varphi$) and this regardless of the magnitude of the force K. Moreover for such a value of $\varphi$ the change in $K_w$ for small changes of $\varphi$ is approximately a constant. For values of $\varphi$ between 75° and 105°, the $\sin \varphi$ may be taken to be zero in Equation 7 and $\cos \varphi$ may be taken equal to 1 in Equation 8.

Accordingly, in view of the above equations, the thrust and torque can be calculated one from the other for the converting mechanism of this invention, if the length, eccentricity and angular displacement of the connecting means are known; and furthermore, the thrust and/or torque can be varied by changing any one or more of these factors.

*Application of the converter to aircraft*

Figure 5:
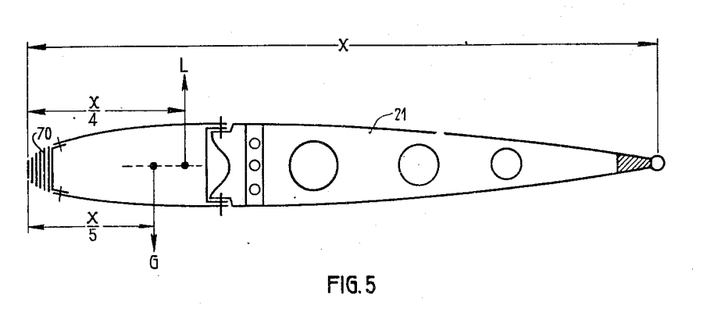
Fig. 5 is a diagrammatic cross-section of the rotor blade of a helicopter or an autogiro.

In Fig. 5 there is shown diagrammatically a cross-section of an airfoil type of propeller blade, such as the type employed in an airship, and more particularly for the rotor of a helicopter or autogiro. One way of adapting the thrust torque converter to the blade or vane of such an airship rotor is to construct the airfoil blade so that the longitudinal axis of its center of gravity is not in line with the longitudinal axis of its lift or aerodynamic center. This may be accomplished by weighting the leading edge of the airfoil blade by means 70 in Fig. 5. Normally the center of lift (at the base of arrow L) and the center of gravity (at the base of arrow G) would coincide at about one fourth ($x/4$) of the distance back along the chord $x$ of the airfoil section from the leading edge of the section. With the weighted portion 70, the center of gravity is moved forward to be about one fifth ($x/5$) of the length of the chord $x$ back from the leading edge. The difference between the center of lift and the center of gravity of the blade section according to Fig. 5 to which centers forces are applied when the blade is in rotation, produce a couple which normally tends to reduce the pitch of the blade or lower its leading edge when the lift L is increased. Thus the axis of rotation for the airfoil or blade 21 is preferably between the vectors represented by the arrow G from its center of gravity and the arrow L from its aerodynamic center or center of lift (see Fig. 5). This location of the center of rotation of the blade between the centers of the forces of the couple, tends to stabilize the blade and to prevent it from fluttering. This couple and moment may be counteracted automatically by the thrust torque converting mechanism of this invention, which mechanism is connected between the base of the blade and the hub for the blade. Thus, even the slightest variation in the lift force of the blade due to difference in air density, as at different altitudes or in air pockets, will be immediately compensated for by a force tending to rotate the whole blade in an opposite direction to change its pitch correspondingly and automatically without any movement or operation upon the part of the pilot or operator of the airship, thereby maintaining a constant lift force L on the rotor regardless of the air speed or rotor speed.

Also the thrust torque connecting mechanism of this invention can automatically feather or change the pitch of the rotating blades periodically each revolution of the blades, governed by the lift on one blade which changes each revolution and is greater in the forward direction than in the rearward direction. This change in lift will automatically through the converter change the pitch to be smaller during the forward motion of the blade than during its rearward motion. Accordingly, with this thrust torque converter, the swash plate of a helicopter need only be employed for steering the ship, and all external disturbances are compensated for automatically, thereby materially relieving the fatigue of the pilot or operator of the ship.

Referring now back to the embodiment of the thrust torque mechanism shown in Figs. 3 and 3b, the pairs of rods or bars 24 and 25 acting as connecting means between the hub 23 and base of the blades 21 and 22, respectively, correspond to the connecting bars 64 and 65 of Fig. 4. In the system of Figs. 3 and 3b the ends of the rods 24 and 25 are rigidly connected to the hub and to the blade bases, the connection of one end of each rod being close to about 90° out of axial alignment with the connection of the other end of said rod, thereby establishing a 90° angle $\varphi$ to respond or produce the desired torsional force from a thrust longitudinally along the blade due mainly to centrifugal force.

Figure 8:
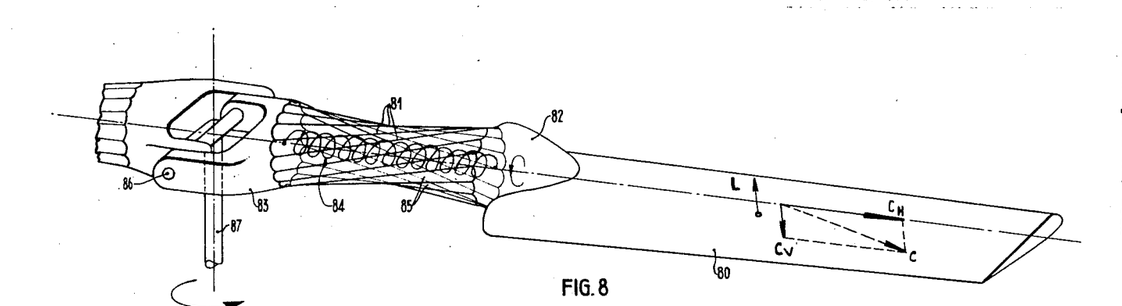
Fig. 8 is a diagrammatic perspective view or a rotor blade of an autogiro incorporating another embodiment of the thrust torque converting mechanism of this invention.

A rigid thrust torque converting mechanism employed together with a helical spring is illustrated in Fig. 8 for a propeller or rotor of an autogiro, in which there are no means for periodically or individually adjusting the pitch of the rotating blades as they rotate. An autogiro differs from a helicopter in that the horizontally rotating lift blades or rotor is driven by the air stream and forward movement of the ship while the helicopter rotor is continuously power driven during flight. Steering of an autogiro is often accomplished by tilting the whole rotor assembly instead of periodically changing the pitch of the blades by means of a swash plate.

In this Fig. 8, an airfoil blade 80 of an autogiro is shown with its center of gravity on the center line along which one vector component $C_H$ of the centrifugal force or vector C is applied when the blade is in rotation, which centrifugal force C also has a component $C_V$ perpendicular to this center line from the center of gravity. Since this component $C_V$ is applied at a point forward with respect to the leading edge of the blade to that of the center of lift from which an opposite component or force vector L is applied due to the aerodynamic lift of the blade, a moment is produced between the vectors $C_V$ and L tending to reduce the pitch of the blade while the blade is in motion. This moment is counteracted automatically by (1) the action of the thrust torque converting mechanism comprising a plurality of equally spaced connecting means or bars 81 rigidly mounted at each of their ends to the base 82 of the blade 80 and to the hub 83, respectively; as well as by (2) the action of the helical compression spring 84, influencing the torque by its axial thrust. The bars 81 in this embodiment are shown to be formed integrally with base 82 and hub yoke 83, such as by milling out the spaces 85 between them, as in forming splines, in a cylindrical piece of stock, the ends of which cylindrical piece of stock are shaped to form the blade base 82 and hub yoke 83 of one rotor blade. The two opposite blades shown in the embodiment of Fig. 8 are horizontally hinged together on pin 86 fastened to the top end of a rotatable shaft 87, thereby permitting each blade 80 to raise automatically to its coning angle when in operation, thereby preventing rolling of the airship suspended from the shaft 87.

*Variable thrust torque converters*

As evidenced by the above formulae and particularly Equation 7, the effect of the forces converted may be varied by varying any one or more of the factors in the equation, for example:

(*a*) Increasing and decreasing the eccentricity of the joints at the ends of the connecting means or bars *b*, i. e. varying $a_1$ or $a_2$ or both (see Fig. 9 described below);

(*b*) Varying the eccentricity of joints provided intermediate the ends of the connecting rods or bars *b* (see Fig. 10 described later);

(*c*) Varying the length of the connecting elements or means *b*;

(*d*) Varying the axial thrust K; (for example variations in rotor speed);

(*e*) Varying the angle $\varphi$ between the bodies V and H; and/or (*f*) Varying the internal forces, such as the tension or compression by addition of springs (as 84 in Fig. 8 and 170 in Fig. 10b), indicated by terms $K_s$ and/or $M_s$ in the above Equation 7.

The control of these variable means may be effected automatically such as by resilient means or springs as shown in Fig. 8, and/or mechanically through links and levers as shown in Figs. 3, 3a, 3b, 9, 10, 10a and 10b, which links and levers may be operated manually or by a power source (not shown), as desired.

Figure 9:
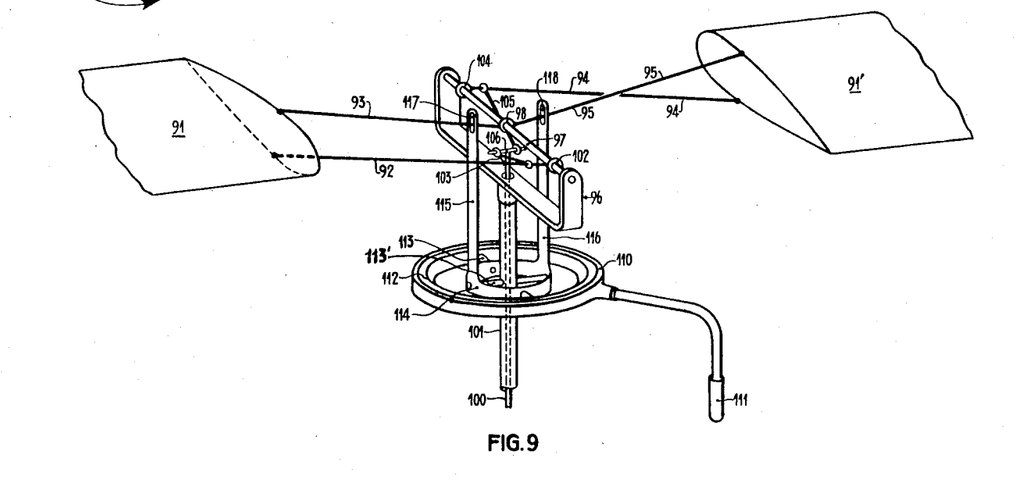
Fig. 9 is a diagrammatic perspective view of the control mechanism for the rotor blades of a helicopter embodying an adjustable thrust torque converting mechanism according to this invention.

An example of a device in which the radii of the joints from the torsional axis are varied at one of the bodies of a mechanism according to this invention, is illustrated schematically in Fig. 9 for two opposing rotor blades 91 and 91' of a helicopter rotor. The two pairs of connecting rods or bars 92, 93, 94 and 95 comprise the connecting means of the thrust torque converter. The bars are joined vertically and rigidly at one of their ends to the base of the blades 91 and 91' and horizontally at their other ends to a hub assembly comprising a U-shaped bracket 96. Between the outer upper ends of this bracket 96, is connected a horizontal rod 97 to which said other ends of the connecting bars 92, 93, 94 and 95 are fastened. The upper bars 93 and 95 are both rigidly attached to one central collar 98, which collar may slide axially along the bar 97, while the lower bars 92 and 94 have their said other ends rigidly attached to separate outer collars 102 and 104, respectively, which also may slide axially along the rod 97 toward and away from the central collar 98. The simultaneous movement of collar 102 and 104 is effected by the operation of the link 100 located in the hollow center of the rotor axis and driving shaft 101. The upper end of the link 100 has pivoted thereto on axis 106 a pair of short links 103 and 105 which are connected respectively to the bars 92 and 94 near the collars 102 and 104. Thus, a downward pull on the link 100 will cause the collars 102 and 104 to simultaneously move the same amount toward the central collar 98, thereby shortening the radii $a_2$ of the converter, and thereby decreasing its torque with relationship to a given thrust. And vice versa, by pushing up on the link 100 these radii are increased, thereby increasing the torque converted by a given thrust, so that change in the pitch of the blades 91 and 92 will be against more resistance for a given change in lift, and/or rotational speed.

There is also shown in Fig. 9 a swash plate assembly, the outer tilting ring 110 of which is connected to a manually controlled lever 111. The inner rotating ring 112 of this assembly is universally connected by means of crossed axes 113 to the rotor driving shaft 101. Suspended by and rotating between the axes 113 and 113' is a central ring member 114 having diametrically placed upwardly extending guides 115 and 116 at the upper ends of which are provided slots 117 and 118 through which the bars 93 and 94 extend near their connection with the central collar 98. Thus when the manual lever 111 is moved to tilt the swash plate assembly, the guides 115 and 116 are caused to periodically oscillate about the axis 113' periodically causing the collar 98 to slide back and forth along the rod 97 over its center. Relative tilt of member 114 about the axis 113 however does not slide, move or raise the central collar 98 on the rod 97 because of the elongated slots 117 and 118 which permit the free up and down movement of the arm guides 115 and 116. Accordingly, only the tilt of the arm guides 115 and 116 about axis 113' periodically feathers or changes the pitch of the blades 91 and 91' as they rotate to effect change in direction of the airship or helicopter in space, i. e. its climb, descent and turning. The handle 111, accordingly, has the same function as the joy stick 30 in the embodiment shown in Fig. 3.

Figures 10, 10A, 10B:
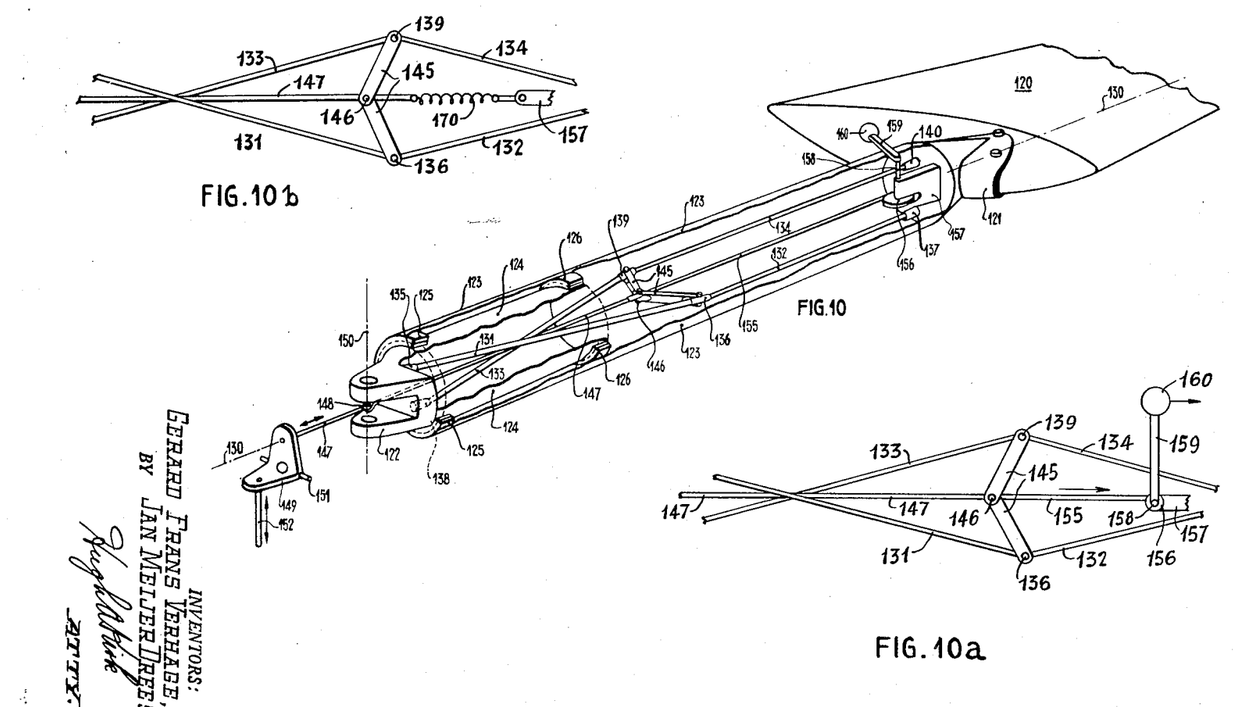
Fig. 10 is a perspective view of still another embodiment of an adjustable type of thrust torque converting mechanism according to this invention, incorporated in the stem of a helicopter or autogiro rotor blade between the base of the blade and its hub.
Fig. 10a is a schematic plan view of that portion of Fig. 10 showing the toggle link connection to the centrifugal force responsive device in and on the stem for the blade.
Fig. 10b is a schematic plan view of an alternate embodiment of that portion of Fig. 10 showing the toggle link connection similar to Fig. 10a but to a resilient device.

Another embodiment of this invention in which the connecting means or links of the converter each comprise a series of rods or elements, or the links are jointed between their ends and are provided with a varying mechanism at such intermediate joints, is shown for the connection of one blade 120 of a helicopter rotor in Fig. 10. Between the base bracket 121 of the blade 120 and the hub vertical hinge member 122, there are shown a pair of telescoping cylindrical sleeves 123 and 124 attached, respectively, at one end to said base 121 and said hinge member 122. At the outer end of each sleeve are attached ring flanges 125 and 126, respectively, which abut against each other when the sleeves are pulled axially apart (i. e. along axis 130), thereby preventing separation of the blade from the hub member in the event the thrust torque converter connecting means inside the sleeves fail. These ring flanges 125 and 126 also fit against the outside and inside surfaces of sleeves 124 and 123 to maintain axial alignment of the blade with the hub member about axis 130 during all telescopic and rotary movements due to thrust along the axis 130 and torque around the axis 130.

Inside these sleeves 123 and 124, there are connected in tandem two pairs of connecting bars 131, 132, 133 and 134, the remote ends of the tandem system being connected in vertical alignment while their intermediate joints are horizontally aligned, thereby giving a 180° twist to each pair of bars, 131—132 and 133—134. The hub end of bar 131 may be mounted near the top of the hub member in a ball and socket joint 135 (as shown in Fig. 6), joined to the pivot 136 about halfway towards the base 121 along the leading side of the sleeve 123, where it is connected with the inner end of its connecting bar 132 which bar 132 is joined to the base 121 near its bottom by another ball and socket joint 137. Similarly, the bar 133 is connected at its inner end in a ball and socket joint 138 near the bottom of the hub 122, joined to the pivot 139 about halfway towards the base 121 but along the trailing side of the sleeve 123, where it is connected with the inner end of its connecting bar 134 which bar 134 is joined to the base 121 near its top by another ball and socket joint 140. The pivots 136 and 139 between the tandem pairs of bars are supported, and may be varied in radial distance simultaneously from the axis 130, by means of the toggle links 145 (see also Fig. 10a) whereby radii, corresponding to $a_1$ or $a_2$ in the Equation 7 above, may be varied to vary the torque and change of pitch resulting from a given thrust or centrifugal force along the axis 130. The center pivot 146, joining the adjacent ends of the toggle links 145, is connected to another and operating link 147 which extends through a hole in the center of the hub member 122 to and around a vertically pivoted joint 148 on the vertical drag pivot axis 150 for the whole blade assembly, and then to an L-shaped lever 149 horizontally pivoted at 151. This lever 149 may then be connected to one end of still another operating link 152 that is connected at its other end either to a swash plate for periodically feathering or varying the pitch of the blade during its rotation, or to a manually operated lever. Here, as in the device of Fig. 9, the variation of the radii of the joints 136 and 139 at the toggle 145, either increase or decrease the sensitivity of the blade to differences in lift, to correspondingly vary the pitch of the blade.

If the blade 120 is decreased in pitch or rotated toward the right around the axis 130 relative to the hub member 122, the connecting bars 131, 132, 133 and 134 will be subjected to a tensile stress. As a result of this stress, the joints 136 and 139 will tend to move toward each other under a force tending to fold the outer ends of the toggle links 145 closer together. This force in the toggle links 145 can be reduced, counteracted or prevented automatically by connection of the toggle center pivot 146 to a centrifugal force responsive device on the blade itself. Such a device is shown, in perspective in Fig. 10 and in plan in Fig. 10a, connected to the pivot 146 by a steel tape 155 which wraps around a pulley 156 mounted on bracket 157 mounted on the blade base member 121. The axle 158 of the pulley 156 turns with the pulley and has fastened thereto a lever arm 159 to the outer end of which lever arm is connected a weight 160 responsive to changes in centrifugal force. The weight 160 is so positioned that it will cause rotation of the pulley 156 to pull on the tape 155 when a greater centrifugal force is applied to the weight 160 by an increased rotor speed of the blade.

Although the centrifugal weight 160 in the embodiment in Figs. 10 and 10a is shown to control the variation of the toggle links 145, a spring means 170, such as shown in Fig. 10b connected between the toggle joint 146 and the bracket 157, may be inserted in place of said weight without departing from the scope of this invention. This spring 170 may compensate at least in part the force on the toggle link 145 in order to facilitate the control through links 147 and 152. In fact any one of the control means shown in any one embodiment may be used in another embodiment having a different number of blades, or different types of joints at the ends of the coupling means, or a different kind of periodic pitch control mechanism such as a swash plate without departing from the scope of this invention.

In the foregoing it has been shown that the joints between the connecting bars or means of the thrust torque converter of this invention may be rigid as in Figs. 3 and 8, universal as in Fig. 7, or of ball and socket type as in Figs. 4, 6 and 10, any one of which type of connections may be employed with or without a spring or other resilient mechanism (see Figs. 8 and 10b) to urge the bodies of the mechanism toward a given relative angular position. Furthermore, the connecting bars b may be only tension members (as wires or ropes), only compression members, tension and compression members, and/or torsion transmitting members (as bars or rods), depending upon the direction of the thrust and/or the type of joints employed. In Fig. 10 a converter having a plurality of connecting members in tandem is illustrated. Also as illustrated in Fig. 8, the number of twisted connecting members which may be employed between two bodies may be increased from one, and preferably two for balanced operation, to as many as may be practical thereby increasing the amount of thrust which can be converted by the mechanism.

While there is described above the principles of this invention in connection with specific apparatus, it is to be clearly understood that this description is made only by way of example and not as a limitation to the scope of this invention.

What is claimed is:

1. In a helicopter, having a rotor with a hub and a plurality of radially extending blades therefrom of substantially airfoil cross-section, the combination with said rotor of, weighted leading edges on said blades so that their centers of gravity are forwardly of their centers of lift, ailerons incorporated in said blades, manually adjustable means for controlling said ailerons for varying the pitch of said blades, coupling means disposed in said hub connecting said adjustable means with said ailerons, and a thrust-torque converting means for connecting the base end of each blade to said hub, whereby a torque is produced about an axis longitudinal of each blade forwardly of its center of lift which tends to control further the pitch of said blades.

2. An airship rotor having a variable pitch streamlined blade and a hub therefor, said blade having its aerodynamic center rearwardly of its center of gravity with respect to the leading edge of said blade to produce a couple of the lift and weight forces of said blade, a coupling mechanism being arranged around an axis extending radially from said hub and extending through said blade forwardly of said aerodynamic center and on which axis said blade rotates, said coupling mechanism comprising, means for transforming forces tending to rotate said blade around said axis into forces applied longitudinally along said axis, said means including only a pair of coupling links extending between said hub and said blade, said links being located on opposite sides of said axis, a joint at each end of each said link attaching said links to the hub and said blade, said joints being eccentric to said axis and said joints at opposite ends of each link being angularly displaced around said axis with respect to each other, whereby the forces of said couple and the centrifugal force on said blade coact to stabilize variations in pitch of said blade.

3. A rotor according to claim 2 wherein said leading edge of said blade is weighted in order to have the center of gravity of said blade forward of said aerodynamic center.

4. A rotor according to claim 2 wherein said links are made of resilient material.

5. A rotor according to claim 2 wherein at least part of said joints are rigid.

6. A rotor according to claim 2 wherein at least part of said joints are universal type joints.

7. A rotor according to claim 2 wherein said eccentricity of said joints at the same ends of said links is the same.

8. A rotor according to claim 2 wherein each of said links has at least one joint intermediate its ends.

9. A rotor according to claim 2 including means to control said forces.

10. A rotor according to claim 9 wherein said control means comprises means to vary simultaneously the eccentricity of adjacent joints.

11. A rotor according to claim 10 including joints intermediate the ends of each link whose eccentricity is varied.

12. A rotor according to claim 11 wherein said means for varying said intermediate joints comprises a toggle.

13. A rotor according to claim 9 wherein said control means includes a resilient means.

14. A rotor according to claim 13 wherein said resilient means comprises a torsion bar.

15. A rotor according to claim 13 wherein said resilient means comprises a helical spring.

16. A rotor according to claim 9 wherein said control means includes a swash plate, and means for connecting said control means to said swash plate.

17. A rotor according to claim 9 wherein said control means includes means to automatically and periodically adjust the pitch of said blade.

18. A rotor according to claim 9 wherein said control means includes a variable aileron mounted on said blade.

19. A rotor according to claim 9 wherein said control means includes a centrifugal force responsive device.

20. An airship rotor having a plurality of independently variable pitch streamlined blades and a hub therefor, each said blade having its aerodynamic center rearwardly of its center of gravity with respect to the leading edge of said blade to produce a couple of the lift and weight forces of said blade, a coupling mechanism for each said blade being arranged around an axis extending radially from said hub and extending through said blade forwardly of said aerodynamic center and on which axis said blade rotates, said coupling mechanism comprising, means for transforming forces tending to rotate said blade around said axis into forces applied longitudinally along said axis, said means including at least a pair of coupling links extending between said hub and said blade on opposite sides of said axis, a joint at each end of each said link attaching said links to said hub and said blade, said joints being eccentric to said axis and said joints at opposite ends of each link being angularly displaced around said axis with respect to each other, whereby the forces of said couple and the centrifugal force of said blade coact to stabilize variations in pitch of said blade, and manually operated means connected through said hub for varying the effect of said force transforming means, said manually operated means including means for automatically and periodically varying the pitch of each blade each rotation of said rotor.

21. A rotor according to claim 20 wherein said leading edge of said blade is weighted in order to have the center of gravity of said blade forwardly of said aerodynamic center.

22. A rotor according to claim 20 wherein said links are made of a resilient material.

23. A rotor according to claim 20 wherein at least part of said joints are rigid.

24. A rotor according to claim 20 wherein at least part of said joints are universal type joints.

25. A rotor according to claim 20 wherein the eccentricity of said joints at the same ends of said links is the same.

26. A rotor according to claim 20 wherein said manually operated means includes means to vary simultaneously the eccentricity of adjacent joints.

27. A rotor according to claim 20 wherein said automatic means for varying said pitch includes a resilient means.

28. A rotor according to claim 20 wherein said manually operated means comprises a swash plate.

29. A rotor according to claim 20 wherein said manually operated means includes an aileron mounted on said blade.

30. An airship rotor having a variable pitch streamlined blade and a hub, said blade having its aerodynamic center rearwardly of its center of gravity with respect to the leading edge of said blade to produce a couple of the lift and weight forces of said blade, a coupling mechanism being arranged around an axis extending radially from said hub and extending through said blade forwardly of said aerodynamic center and on which axis said blade rotates, said coupling mechanism comprising, means for transforming forces tending to rotate said blade around said axis into forces applied longitudinally along said axis, means including at least a pair of coupling links extending between said hub and said blade on opposite sides of said axis, a joint at each end of each said link attaching said links to said hub and said blade and a joint intermediate the ends of each link, said joints being eccentric to said axis and at opposite ends of each link said joints being angularly displaced around said axis with respect to each other, and a centrifugal force responsive means for automatically varying the pitch of said blade whereby the forces of said couple and the centrifugal force on said blade coact to stabilize variations in pitch of said blade, said centrifugal force means including means for varying simultaneously the eccentricity of adjacent joints.

31. A rotor according to claim 30 wherein said means for varying the eccentricity of said joints comprises a toggle connected between said intermediate joints.

References Cited in the file of this patent

UNITED STATES PATENTS

| | | |
|---|---|---|
| 1,919,089 | Brequet et al. | July 18, 1933 |
| 1,973,573 | Lougheed | Sept. 11, 1934 |
| 2,045,355 | Hays | June 23, 1936 |
| 2,265,366 | Hafner | Dec. 9, 1941 |
| 2,443,393 | Landgraf | June 15, 1948 |
| 2,575,533 | Seibel | Nov. 20, 1951 |
| 2,669,313 | Lightfoot | Feb. 16, 1954 |

FOREIGN PATENTS

| | | |
|---|---|---|
| 232,343 | Great Britain | Apr. 21, 1925 |
| 512,772 | France | Oct. 22, 1920 |
| 545,152 | France | July 13, 1922 |